United States Patent
Ogawa et al.

(10) Patent No.: US 6,276,747 B1
(45) Date of Patent: Aug. 21, 2001

(54) STRUCTURE FOR REDUCING WIND NOISE

(75) Inventors: Atomu Ogawa, Nisshin; Toshiyuki Mizuno, Aichi-ken, both of (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/585,574

(22) Filed: Jun. 2, 2000

(30) Foreign Application Priority Data

Aug. 26, 1999 (JP) .................................................. 11-239651

(51) Int. Cl.$^7$ ................................. B60J 1/20; B60R 9/05
(52) U.S. Cl. ......................................... 296/180.1; 224/316
(58) Field of Search ............................ 296/180.1, 180.2, 296/180.4; 224/316

(56) References Cited

U.S. PATENT DOCUMENTS

| | | | |
|---|---|---|---|
| 4,195,874 | * 4/1980 | Janssen et al. | 296/180.1 |
| 4,501,385 | * 2/1985 | Bott | 224/319 |
| 4,743,057 | * 5/1988 | Loren | 296/180.1 |
| 5,240,536 | * 8/1993 | Kurobe | 156/228 |
| 5,282,560 | * 2/1994 | Ozog | 224/316 |
| 5,474,218 | * 12/1995 | Arenault, Jr. et al. | 224/316 |

FOREIGN PATENT DOCUMENTS

| | | |
|---|---|---|
| 9-2339 | 1/1997 | (JP) . |
| 10-45046 | 2/1998 | (JP) . |
| 10-278855 | 10/1998 | (JP) . |

\* cited by examiner

*Primary Examiner*—D. Glenn Dayoan
*Assistant Examiner*—Paul Chenevert
(74) *Attorney, Agent, or Firm*—Finnegan, Henderson, Farabow, Garrett & Dunner, L.L.P.

(57) ABSTRACT

A front crossbar of a roof rack provided above a roof along the width of a vehicle comprises an upper surface and a lower surface. The upper surface is smoothly curved and convex toward the upper direction, and the upper surface introduces an attached flow of air from the front of the vehicle to the rear of the vehicle. The lower surface of the front crossbar comprises a flow compression face in the front of the lower surface, a flow leading face in the center of the lower surface, and a flow separation portion in the rear of the lower surface. The flow compression face is hollowed toward the center point of the cross-section of the front crossbar, and introduces and compresses the air flow from the front of the vehicle. The flow leading face is a smooth convex arc of a circle as the cross-section, and leads the air flow compressed from the front of the front crossbar to the rear of the front crossbar. The flow separation portion is notch shaped like a step, and separates the air flow from the front of the front crossbar. Since the difference of the pressure, the velocity, or etc. between the two air flows separated to the lower and upper sides of the front crossbar is high, a Karman vortex which causes wind noise of the front crossbar can be avoided. Consequently, the wind noise of the roof rack can be reduced efficiently.

15 Claims, 5 Drawing Sheets

STRUCTURE FOR REDUCING WIND NOISE

FIELD OF THE INVENTION

The present invention relates to a structure for reducing wind noise. The structure for reducing wind noise is provided above a roof of a vehicle along the width of the vehicle.

BACKGROUND OF THE INVENTION

One example of a structure for reducing wind noise mounted on a vehicle is shown in Japanese Laid-Open Patent Application No. 9-2339.

As shown in FIG. 5, a vehicle is equipped with a roof spoiler 100 on a roof of the vehicle at a predetermined height along the width of the vehicle. The roof spoiler 100 has a structure for reducing wind noise. The roof spoiler 100 comprises two surfaces, which are an upper surface 100A and a lower surface 100B. A flow regulating means 102 is shaped at least on one of two surfaces (It is the lower surface in the case shown in FIG. 5.). The flow regulating means 102 regulates a direction of the air flow flowing along the surfaces of the roof spoiler 100 to a predetermined direction, so that two pressures or two velocities generated along the upper and lower surfaces 100A, 100B of the roof spoiler 100 are unbalanced at the place near the rear end portion 100C. By the advantage of this structure, the distance between the very front and the very rear of the roof spoiler 100 is not unnecessarily long. That is, the size of the roof spoiler 100 is restrained, and a Karman vortex of the air flow is reduced. Accordingly, a wind noise of the roof spoiler 100 is reduced.

In the structure for reducing wind noise shown in FIG. 5, however, the difference between two pressures or velocities of the upper and lower air flows along the roof spoiler 100 might not be sufficiently high, because the flow regulating means 102 is shaped at least on one of the upper and lower surfaces 100A and 100B. It might result in not sufficiently eliminating the Karman vortex, which is the cause of the wind noise. It means that the wind noise might not be reduced efficiently by the above-mentioned structure for reducing wind noise.

SUMMARY OF THE INVENTION

It is thus one object of the present invention to solve the aforementioned problems. That is, the object of the invention is to provide a structure for reducing wind noise efficiently.

A structure for reducing wind noise provided above a roof along the width of a vehicle comprises an upper surface and a lower surface of the structure. The upper surface introduces an attached flow of air from the front of the vehicle to the rear of the vehicle. The lower surface of the structure comprises a flow compression face, a flow leading face, and a flow separation portion. The flow compression face in the front of the lower surface introduces and compresses the air flow from the front of the vehicle. The flow leading face in the center of the lower surface leads the air flow compressed from the front of the structure to the rear of the structure. The flow separation portion in the rear of the lower surface separates the air flow from the front of the structure.

The lower flow of the air from the front of the vehicle and above the roof of the vehicle, is first introduced to the roof side and compressed by the flow compression face in the front of the lower surface. Accordingly, the pressure of the air flow increases. Next, the air flow is lead to the rear of the structure by the flow leading face in the center of the lower surface, and the air flow is separated from the structure by the flow separation portion in the rear of the lower surface. Then, in the rear of the structure the separated air flow unites together with the air flow along the upper surface of the structure. Consequently, the difference of the pressures, the velocities, or etc. between the two air flow separated to the lower and upper sides of the structure is greater. Then, a Karman vortex which causes a wind noise of the structure can be avoided, though a front-rear length of the structure is not unnecessary long. In these ways the wind noise of the structure can efficiently be reduced.

The above-mentioned flow compression face is hollowed toward the center point of the cross-section of the structure, the flow leading face is a smooth convex arc of a circle as the cross-section, and the flow separation portion is notch shaped like a step.

Furthermore, the upper surface of the structure is smoothly curved and convex toward the upper direction.

The above-mentioned upper surface of the structure can restrain the separation of the air flow along the upper surface of the structure. Consequently, a Karman vortex which causes a wind noise can be sufficiently avoided, and the wind noise of the structure can be reduced efficiently.

Furthermore, in the center part of the width of the structure along the width of the vehicle, the vertical center line connecting the middle point on the upper surface from the view point of the front-rear direction with the center point of the cross-section of the structure coincides or substantially coincides with the normal line of the roof of the vehicle.

This means that the horizontal center line of the structure is parallel or substantially parallel to the flowing line of the air along the roof of the vehicle, and the horizontal center line is parallel or substantially parallel to a line which is tangent to the roof line as the cross-section. Accordingly, the air flow is compressed efficiently between the flow compression face and the surface of the roof. Then, the wind noise of the structure is further efficiently reduced.

BRIEF DESCRIPTION OF THE DRAWINGS

The above and other objects, features, advantages, and technical and industrial significance of this invention will be better understood by reading the following detailed description of a presently preferred embodiment of the invention, when considered in connection with the accompanying drawing, in which.

DETAILED DESCRIPTION OF PREFERRED EMBODIMENTS

In the following description and the accompanying drawings, the present invention will be described in more detail in terms of specific embodiments. A structure for reducing wind noise as the first embodiment of the present invention is explained using FIGS. 1, 2 and 3.

Incidentally, in each figure the arrow FR shows the front direction of a vehicle and the arrow UP shows the upward direction of the vehicle.

Figure 3:
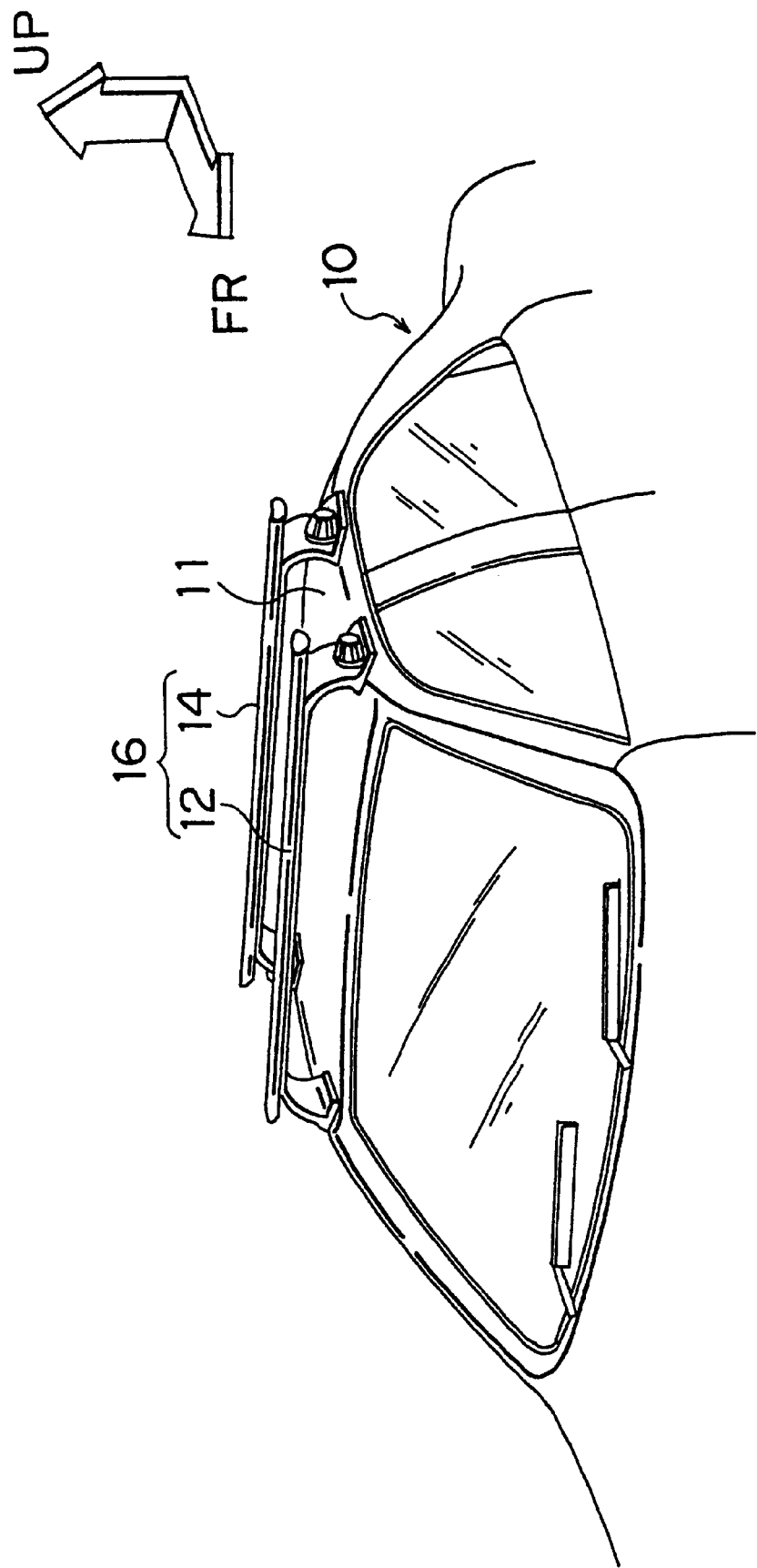
FIG. 3 is an isometric view of an upper part of a vehicle equipped with a roof rack, which has a structure for reducing wind noise as the first embodiment.

With reference to FIG. 3, a vehicle 10 is equipped with a roof rack 16 including two cross bars (A cross bar is also called a structure.) 12, 14 upward on a roof 11 of the vehicle 10. The front crossbar 12 and the rear crossbar 14 are respectively at the front and rear of the roof 11 of the vehicle 10. The crossbars 12, 14 are substantially parallel along the width of the vehicle 10.

Figure 1:
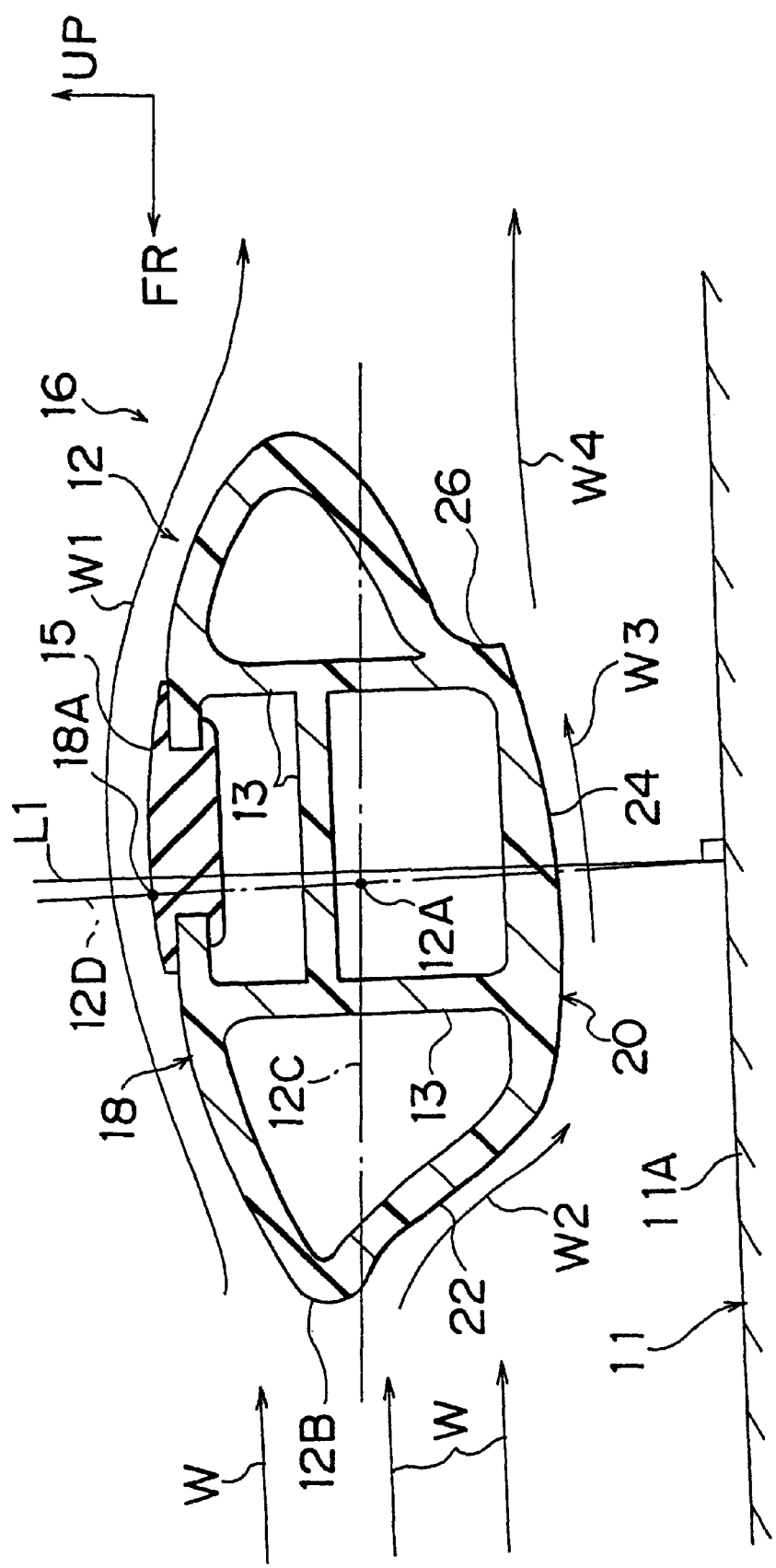
FIG. 1 is a cross-sectional view of a crossbar of a roof rack, which has a structure for reducing wind noise as a first embodiment of the present invention, and which is mounted on the front of a roof of the vehicle.

FIG. 1 shows a cross-sectional view of the front cross bar 12. As illustrated in FIG. 1, an upper surface 18 of the front cross bar 12 is shaped as an upward smooth convex (for example, a convex arc of a circle), and the upper surface 18 leads some part (shown as an arrow W1 in FIG. 1) of an air flow (shown as an arrow W) from the front to the rear of the vehicle 10. The front cross bar 12 is made from resin, and a reinforcement rib 13 is provided inside of the front cross bar 12. A cushion 15, for example a rubber cushion, is fixed on the front cross bar 12. The cushion 15 is for softly receiving a carried object or carried objects put on the roof rack 16.

Furthermore, a flow compression face 22 is shaped at the front face of a lower surface 20 of the front crossbar 12. The flow compression face 22 is hollowed toward a center point 12A of the cross-section of the front crossbar 12. The flow compression face 22 leads some part (shown as an arrow W2 in FIG. 1) of the air flow W from the front to the rear the roof 11, and compresses the air flow W2 between the lower surface 20 and the roof 11.

Incidentally, the center point 12A is defined as follows. Several relatively nearly horizontal lines can be drawn in FIG. 1. Two lines among these lines are selected. One line is tangent to the cross-sectional outline of the front cross bar 12 at the most upper side, and the other line is tangent to it at the most lower side. Such two lines are respectively parallel. In the above-mentioned way, several sets of the two lines can be selected, when the inclination of the nearly horizontal line is varied. Among these sets of the two lines, only one set is selected in which the distance between the parallel two lines (the upper horizontal line and the lower horizontal line) is minimum. Next, a horizontal center line 12C between the selected two lines is defined. That is, the distance between the center line and the upper horizontal line is equal to the distance between the center line and the lower horizontal line. Next, a front vertical line and a rear vertical line are defined as follows. The front vertical line intersects the horizontal center line at right angles and is tangent to the front cross bar 12 at the most front side. The rear vertical line intersects the horizontal center line at right angles and is tangent to the front cross bar 12 at the most rear side. A vertical center line 12D between the front and rear vertical lines is then defined. That is, the distance between the vertical center line and the front vertical line is equal to the distance between the vertical center line and the rear vertical line. The point of intersection of the horizontal center line 12C and the vertical center line 12D is defined as the center point 12A. Furthermore, a middle point 18A is defined as an intersection of the vertical center line 12D and the upper surface 18.

On the front crossbar 12, a flow leading face 24 is shaped in the center of the lower surface 20 in the front-rear direction of the vehicle 10. This flow leading face 24 is a smooth convex arc of a circle as the cross-section of the crossbar 12 and leads the compressed air flow to the rear of the vehicle 10, as shown as an arrow W3 in FIG. 1.

Furthermore, on the front crossbar 12, a flow separation portion 26 is shaped in the rear of the lower surface 20, and the flow separation portion 26 is notch shaped like a step. The flow separation portion 26 separates the air flow from the front crossbar 12, as illustrated as an arrow W4 in FIG. 1.

In this first embodiment, a most front portion 12B of the front crossbar 12 is higher than the horizontal center line 12C. Accordingly, the air flow W is divided to the upper and lower air flows W1, W2 by the most front portion 12B, and the flow amount of the lower air flow W2 is higher than the flow amount of the upper air flow W1.

In the center part of the width of the front crossbar 12 along the width of the vehicle 10, the vertical center line 12D which connects the middle point 18A on the upper surface 18 with the center point 12A of the front crossbar 12 coincides or substantially coincides with the normal line LI of the cross-sectional line 11A of the roof 11 (as shown in FIG. 1). Consequently, the lower air flow W2 is efficiently compressed by the flow compression face 22 and the roof 11.

Figure 2:
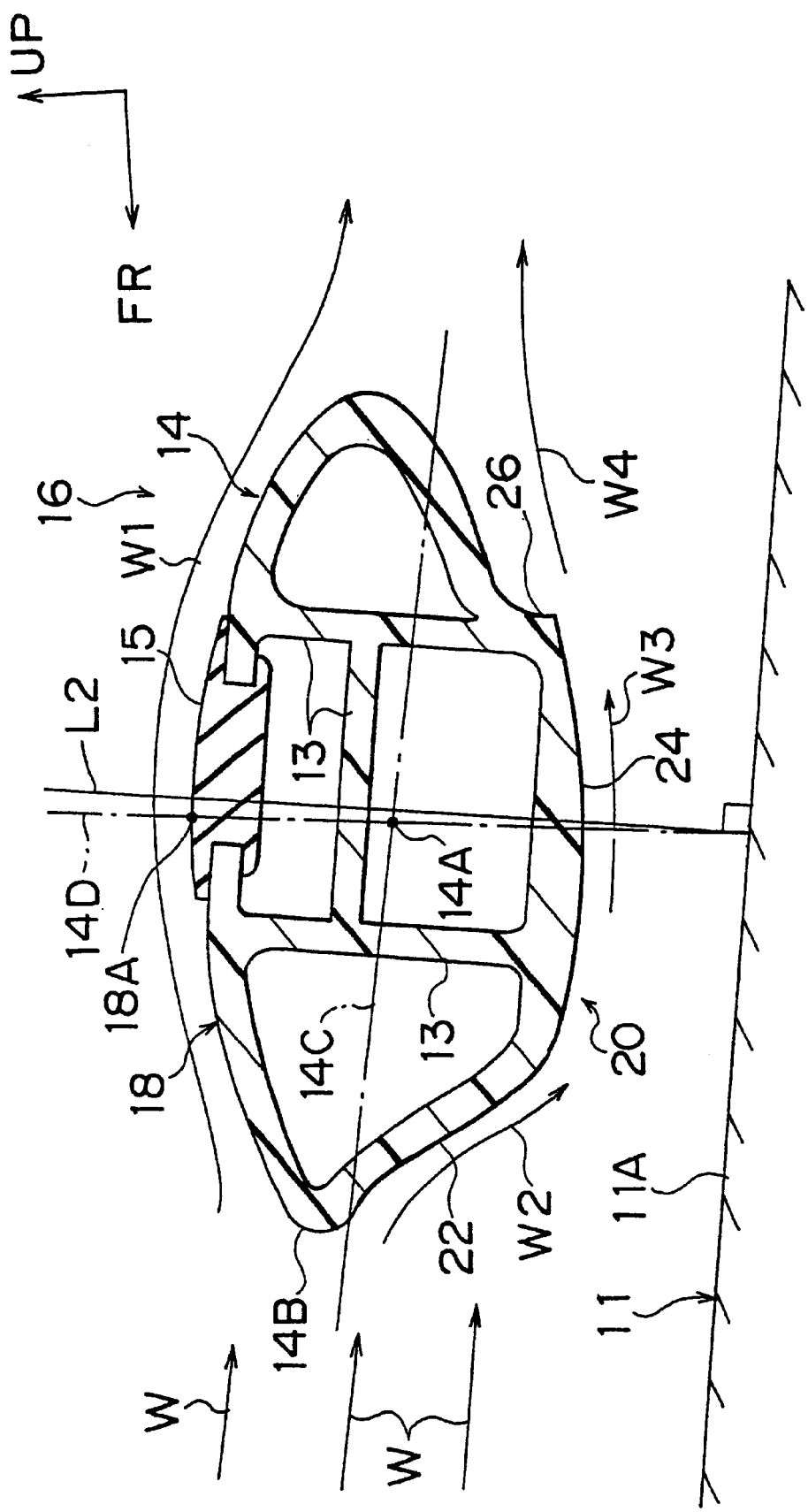
FIG. 2 is a cross-sectional view of a crossbar of a roof rack, which has a structure for reducing wind noise as the first embodiment, and which is mounted on the rear of a roof of the vehicle.

Incidentally, referring to FIG. 2 a cross-sectional view of the rear crossbar 14 of the roof rack 16 is substantially the same as the cross-sectional view of the front crossbar 12. In the center part of the width of the rear crossbar 14 along the width of the vehicle 10, the vertical center line 14D which connects the middle point 18A on the upper surface 18 with the center point 14A of the rear crossbar 14 coincides or substantially coincides with the normal line L2 of the cross-sectional roof line 11A of the roof 11 (as shown in FIG. 2). Consequently, the lower air flow W2 is efficiently compressed by the flow compression face 22 and the roof 11.

Next, the action of this embodiment is explained. In the structure for reducing wind noise of the first embodiment, In the structure for reducing wind noise as the first embodiment, the upper air flow (shown as the arrow W1 in FIG. 1) above the front crossbar 12, is led to the rear of the vehicle 10 along the upper surface 18. Since the lower air flow W2 of the air flow W from the front of the vehicle 10 is first introduced toward the roof 11 and compressed by the flow compression face 22, the pressure of the air flow W2 increases. Subsequently, the air flow W2 is led toward the rear (shown as the arrow W3) by the flow leading face 24 of the front crossbar 12, and the air flow W3 separates (shown as the arrow W4 in FIG. 1) from the front crossbar 12 at the flow separation portion 26. Finally, the air flow W4 unites with the above-mentioned upper air flow W1 at the rear of the front crossbar 12.

Consequently, concerning the two air flows (shown as the arrows W1 and W2) divided at the most front portion 12B toward the upper and lower sides of the front crossbar 12, the difference between the pressures or velocities of the two air flows increases. The upper air flow W1 above the front crossbar 12 can be, then, restrained from separating from the front crossbar 12 at the upper surface 18, especially at the rear of the upper surface 18.

As mentioned above, in the structure for reducing wind noise of the first embodiment, a Karman vortex of the air flows which causes the wind noise can sufficiently be eliminated by a simple structure, and the wind noise of the vehicle can efficiently be reduced.

Since the most front portion 12B of the front crossbar 12 is higher than the horizontal centerline 12C, the amount of the lower air flow W2 is higher than the amount of the upper air flow W1 among the two air flows divided at the most front portion 12B. Accordingly, since the difference between the pressures or velocities of the two air flows W1 and W4 is further higher, the wind noise can be further efficiently reduced.

In the first embodiment, in the center part of the width of the front crossbar 12 along the width of the vehicle 10, the vertical center line 12D which connects the middle point 18A on the upper surface 18 with the center point 12A of the front crossbar 12 coincides or substantially coincides with the normal line L1 of the cross-sectional line of the roof 11. That is, the horizontal centerline 12C of the front crossbar 12 is parallel or substantially parallel to a line which is tangent to the cross-sectional roof line 11A of the roof 11. Consequently, the air flow between the flow compression face 22 and the roof 11 is efficiently compressed, and the wind noise is further reduced.

Furthermore, by adopting the aforementioned shape for the front crossbar 12, not only the wind noise can efficiently be reduced, but a front-rear length of the front crossbar 12 can also be reduced while an up-down thickness of the front crossbar 12 which affects the strength of the front crossbar 12 is sufficiently secured. From the view of the front crossbar 12 from the front and rear sides, the front crossbar 12 looks slim in the up-down direction because of a shadow effect of the shape. A whole outward appearance of the roof rack 16 is improved.

Incidentally, concerning the rear crossbar 14, the same effect as the front crossbar 12 can be obtained because of the same action.

Figure 4:
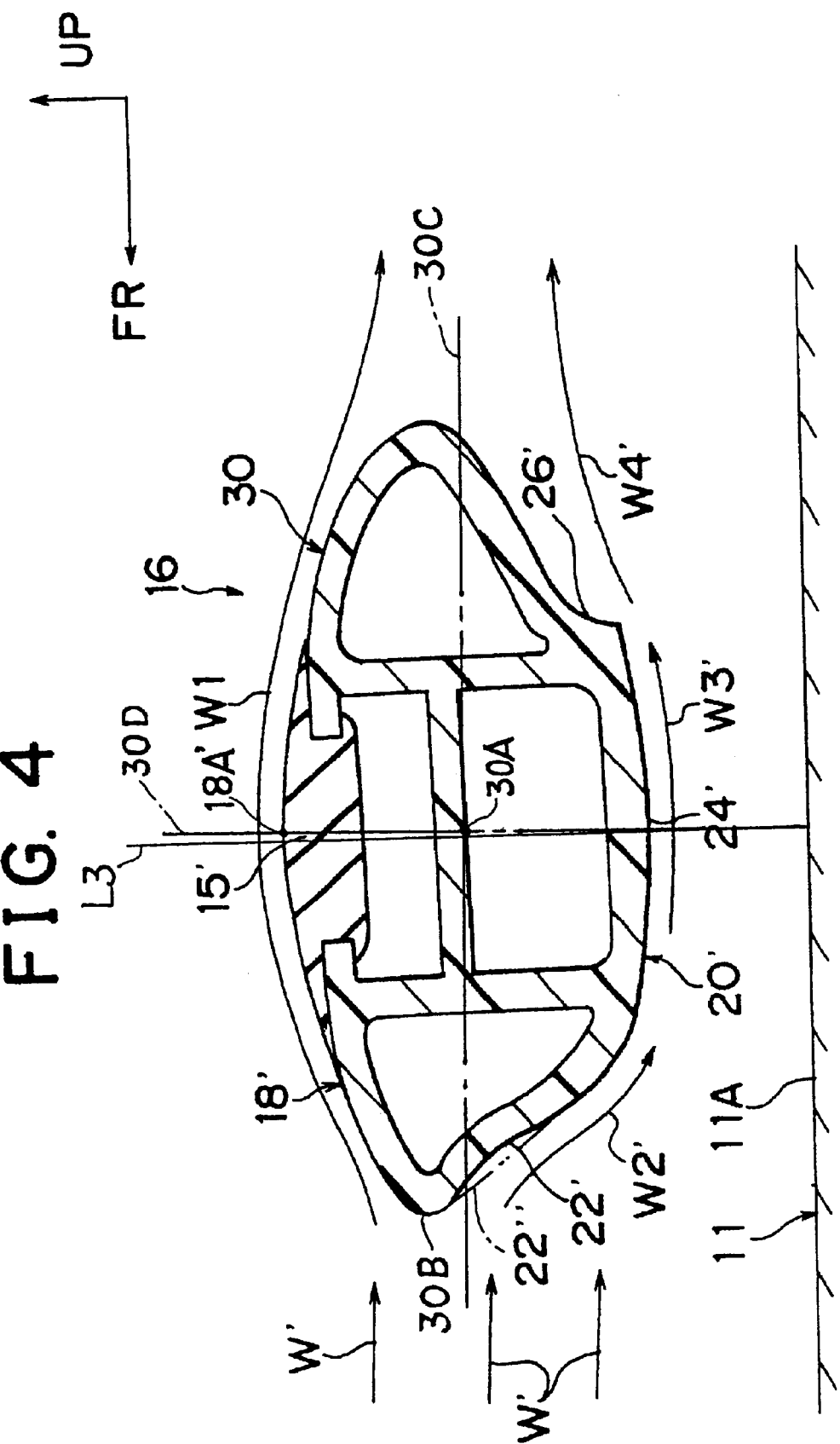
FIG. 4 is a cross-sectional view of a crossbar of a roof rack, which has a structure for reducing wind noise as a second embodiment of the present invention.
Figure 5:
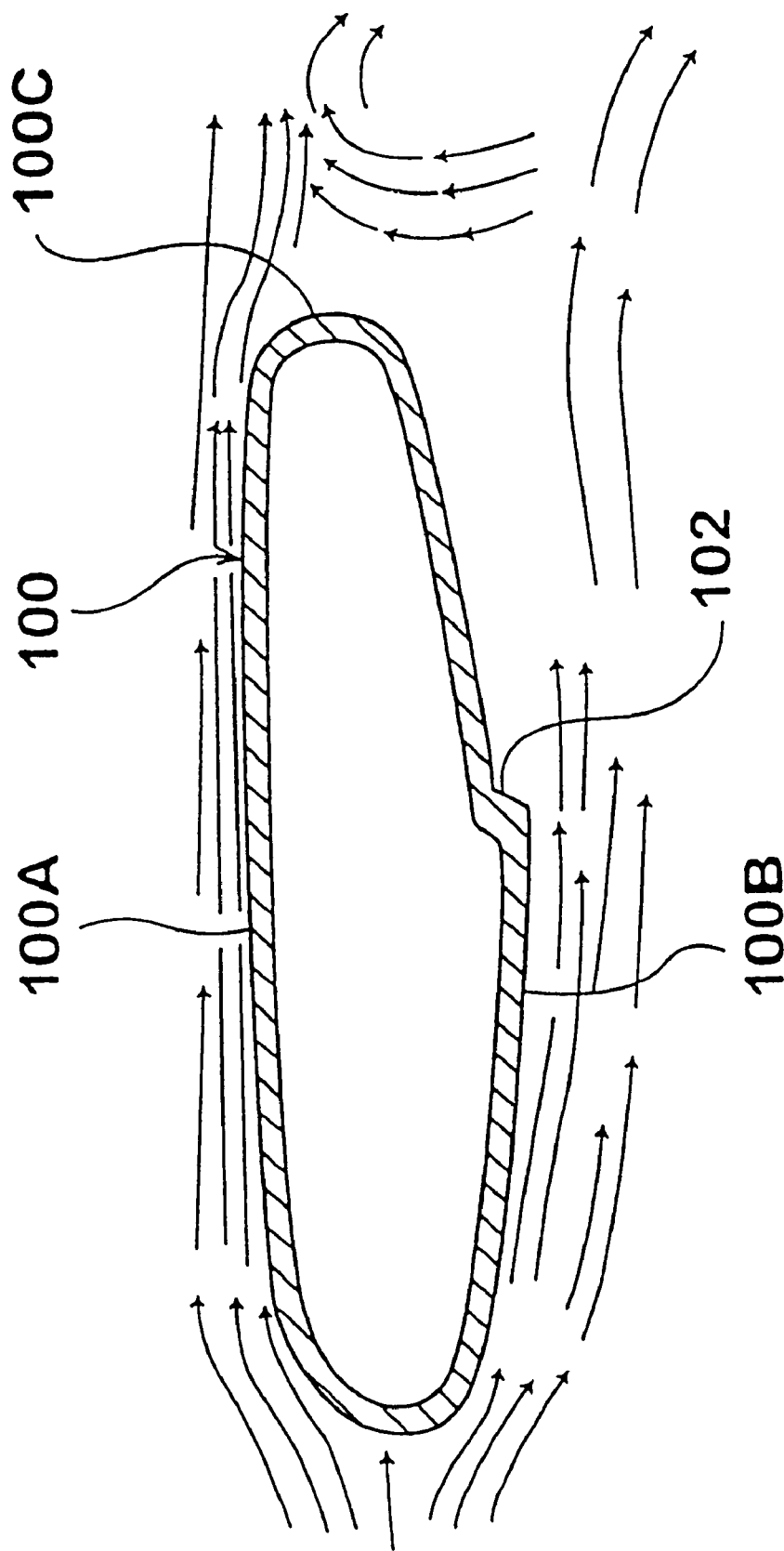
FIG. 5 is a cross-sectional view of a roof spoiler, which has a conventional structure for reducing wind noise.

The specified embodiment of the invention is above explained, however, this invention is not limited on this embodiment, and it is apparent that other embodiments are available within the scope of this invention. For example, the second embodiment of the invention is depicted next. In the second embodiment, a crossbar 30 is shown in FIG. 4 in place of the front cross bar 12 or the rear crossbar 14. A shape of an upper surface 18' and a lower surface 20' which includes a flow compression face 22', a flow leading face 24', and a flow separation portion 26' have a bit different shapes from the respective shapes of the front crossbar 12 or the rear crossbar 14. Such a crossbar 30 of the second embodiment is also available. Furthermore, a plane slanting from the upper and the front to the lower and the rear of the crossbar 30 (shown as double-dashed line 22" in FIG. 4) is also available in the place of the hollowed face as the flow compression face 22'.

Since the lower compression face 22' or 22" is hollowed or a plane slanting from the upper and the front to the lower and the rear of the crossbar 30, a lower air flow W2' divided at the most front portion 12B' from the air flow W' is introduced toward the roof 11 and compressed between the flow compression face 22' or 22" and the roof 11. In the same way as mentioned in the action of the first embodiment, the pressure of the air flow W2' increases. Subsequently, the air flow W2' is led toward the rear (shown as an arrow W3') by a flow leading face 24' of the crossbar 30, and the air flow W3' separates (shown as an arrow W4' in FIG. 4) from the crossbar 30 at a flow separation portion 26'. Finally, the air flow W4' unites with an upper air flow W1' at the rear of the crossbar 30.

Since this structure increases the difference between the pressures or velocities of the two air flows W1' and W4', the upper air flow W1' above the front crossbar 30 can be, then, restrained from separating from the front crossbar 30 at the upper surface 18', especially at the rear of the upper surface 18', the Karman vortex which causes the wind noise can sufficiently be eliminated by a simple structure, and the wind noise of a vehicle can efficiently be reduced in the second embodiment.

The structure for reducing wind noise of the invention is not limited on a crossbar of a roof rack, and it can also be adopted for a structure for reducing wind for a roof spoiler provided on a roof of a vehicle or for other parts.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A structure for reducing wind noise provided above a roof along a width of a vehicle comprising:

an upper surface introducing a flow of air from a front of the vehicle to a rear of the vehicle; and a lower surface comprising:

a flow compression face in a front of said lower surface for introducing and compressing the air flow from the front of the vehicle, a flow leading face in a center of said lower surface for leading the air flow compressed from the front of said structure to a rear of said structure, and a flow separation portion in a rear of said lower surface for separating the air flow from the front of said structure, wherein a frontmost portion of said structure is higher than a horizontal centerline of a cross-section of said structure.

2. The structure for reducing wind noise according to claim 1, wherein said flow compression face is hollowed toward the center point of the cross-section of said structure.

3. The structure for reducing wind noise according to claim 1, wherein said flow compression face is a plane slanting from the upper and the front to the lower and the rear of said structure.

4. The structure for reducing wind noise according to claim 1, wherein said flow leading face is a smooth convex arc of a circle as the cross-section.

5. The structure for reducing wind noise according to claim 1, wherein said flow separation portion is notch shaped like a step.

6. The structure for reducing wind noise according to claim 1, wherein said flow compression face is hollowed toward the center point of the cross-section of said structure, said flow leading face is a smooth convex arc of a circle as the cross-section, and said flow separation portion is notch shaped like a step.

7. The structure for reducing wind noise according to claim 6, wherein said upper surface of said structure is smoothly curved and convex toward the upper direction.

8. The structure for reducing wind noise according to claim 6, wherein in the center part of the width of said structure along the width of the vehicle, the vertical center line connecting the middle point on said upper surface from the view point of the front-rear direction with the center point of the cross-section of said structure coincides or substantially coincides with the normal line of the roof of the vehicle.

9. The structure for reducing wind noise according to claim 1, wherein said flow compression face is a plane slanting from the upper and the front of to the lower and the rear of said structure, said flow leading face is a smooth convex arc of a circle as the cross-section, and said flow separation portion is a notch shaped like a step.

10. The structure for reducing wind noise according to claim 9, wherein said upper surface of said structure is smoothly curved and convex toward the upper direction.

11. The structure for reducing wind noise according to claim 9, wherein in the center part of the width of said structure along the width of the vehicle, the vertical center line connecting the middle point on said upper surface from the view point of the front-rear direction with the center point of the cross-section of said structure coincides or substantially coincides with the normal line of the roof of the vehicle.

12. The structure for reducing wind noise according to claim 1, wherein said upper surface of said structure is smoothly curved and convex toward the upper direction.

13. The structure for reducing wind noise according to claim 1, wherein in the center part of the width of said structure along the width of the vehicle, the vertical center line connecting the middle point on said upper surface from the view point of the front-rear direction with the center point of the cross-section of said structure coincides or substantially coincides with the normal line of the roof of the vehicle.

14. A vehicle comprising the structure for reducing wind noise according to claim 1 installed along the width direction of the vehicle above the vehicle.

15. A structure for reducing wind noise provided above a roof along a width of a vehicle comprising:

upper surface introducing a flow of air from a front of the vehicle to a rear of the vehicle; and a lower surface comprising:
a flow compression face in a front of said lower surface for introducing and compressing the air flow from the front of the vehicle, said flow compression face being hollowed toward a center point of a cross-section of said structure;
a flow leading face in a center of said lower surface for leading the air flow compressed from the front of said structure to the rear of said structure; and
a flow separation portion in a rear of said lower surface for separating the air flow from the front of said structure.

* * * * *

UNITED STATES PATENT AND TRADEMARK OFFICE
CERTIFICATE OF CORRECTION

PATENT NO. : 6,276,747 B1
DATED : August 21, 2001
INVENTOR(S) : Atomu Ogawa et al.

It is certified that error appears in the above-identified patent and that said Letters Patent is hereby corrected as shown below:

Column 6, claim 1,
Line 28, "structure," should read -- structure; --.

Column 8, claim 15,
Line 6, before "upper surface", insert -- an --.

Signed and Sealed this

Twenty-sixth Day of February, 2002

Attest:

JAMES E. ROGAN
Attesting Officer
Director of the United States Patent and Trademark Office